US012255396B2

(12) United States Patent
Jaffri et al.

(10) Patent No.: US 12,255,396 B2
(45) Date of Patent: Mar. 18, 2025

(54) RADIO FREQUENCY REFLECTORS FOR RADIO FREQUENCY IDENTIFICATION SYSTEMS

(71) Applicant: ZEBRA TECHNOLOGIES CORPORATION, Lincolnshire, IL (US)

(72) Inventors: Rehan K. Jaffri, Tarrytown, NY (US); Amit Asthana, Germantown, MD (US); Jeffrey G. Kukkola, Golden Valley, MN (US)

( * ) Notice: Subject to any disclaimer, the term of this patent is extended or adjusted under 35 U.S.C. 154(b) by 329 days.

(21) Appl. No.: 17/732,085

(22) Filed: Apr. 28, 2022

(65) Prior Publication Data

US 2023/0352846 A1 Nov. 2, 2023

(51) Int. Cl.

*H01Q 15/14* (2006.01)
*H01Q 1/22* (2006.01)
*H01Q 1/38* (2006.01)
*H01Q 1/52* (2006.01)

(52) U.S. Cl.

CPC .......... *H01Q 15/14* (2013.01); *H01Q 1/2208* (2013.01); *H01Q 1/38* (2013.01); *H01Q 1/526* (2013.01)

(58) Field of Classification Search

CPC ...... H01Q 15/14; H01Q 1/2208; H01Q 15/18; H01J 23/20; H01P 7/06; G06K 7/10009
See application file for complete search history.

(56) References Cited

U.S. PATENT DOCUMENTS

| | | | | |
|---|---|---|---|---|
| 6,595,422 B1 * | 7/2003 | Doljack | ............ | G06K 7/10722 235/462.43 |
| 8,576,050 B2 * | 11/2013 | Hansen | ............ | G06K 19/07771 340/10.41 |
| 10,360,418 B2 * | 7/2019 | Roth | .................. | G06K 7/10316 |
| 2023/0004733 A1 * | 1/2023 | Kawabe | ............ | G06K 7/10079 |

* cited by examiner

*Primary Examiner* — Dieu Hien T Duong
*Assistant Examiner* — Austin M Back

(57) ABSTRACT

Radio frequency (RF) reflectors for radio frequency identification (RFID) systems are disclosed. An example RF reflector includes a four-sided housing having an open end, an end, two sides, a top, and an open bottom. The RF reflector is configured to not be electrically coupled to an RFID tag reader. The open end is configured to admit RF signals emitted by the RFID tag reader into the RF reflector, and has a dimension greater than a quarter wavelength of the RF signals. The end, the two sides, and the top include a material that at least partially reflects the RF signals, and the end, the two sides, and the top are electrically connected. Another example RF reflector includes a five-sided housing having two ends, two sides, a top, and an open bottom. One of the ends includes an opening to admit RF signals into the RF reflector.

18 Claims, 11 Drawing Sheets

RADIO FREQUENCY REFLECTORS FOR RADIO FREQUENCY IDENTIFICATION SYSTEMS

BACKGROUND

Some radio frequency identification (RFID) systems operate in accordance with an effective isotropic radiated power (EIRP) limit and, thus, may have a limited effective range over which RFID tags can be read. This may be particularly problematic when RFID tags are disposed on objects in positions that are difficult to read via the RFID system.

SUMMARY

In an embodiment, a radio frequency (RF) reflector for use with a radio frequency identification (RFID) system comprises a four-sided housing. The four-sided housing including: an open end configured to admit RF signals emitted by a RF identification (RFID) tag reader into the RF reflector, wherein a dimension of the open end is greater than a quarter wavelength of the RF signals, and wherein the RF reflector is configured to not be electrically coupled to the RFID tag reader; an end comprising a material that at least partially reflects the RF signals; two sides comprising a material that at least partially reflects the RF signals, wherein the end, the two sides, and the top are electrically connected; a top comprising a material that at least partially reflects the RF signals; and an open bottom.

In a variation of this embodiment, the RF reflector is configured to be placed on a work surface during use such that the open bottom is adjacent the work surface, and the top includes one or more top openings configured to admit at least a portion of objects having RFID tags into the RF reflector such that the RFID tags can be read by the RFID tag reader responsive to the RF signals, wherein at least one of the one or more top openings is positioned at a distance from the open end that is greater than a native effective range of the RFID tag reader, and wherein a dimension of the one or more top openings is greater than a quarter wavelength of the RF signals.

In a variation of this embodiment, the objects in the one or more top openings can rest on the work surface.

In a variation of this embodiment, the RF reflector is configured to be inverted during use such that the top becomes a bottom, such that the end and the two sides extend upward from the bottom and upward from the work surface, and one or more objects having RFID tags can be placed on the bottom such that the RFID tags can be read by the RFID tag reader responsive to the RF signals, and the RF reflector is configured such that the RFID tags can be read by the RFID tag reader from distances greater than a native effective range of the RFID tag reader.

In a variation of this embodiment, when the RF reflector is in use, the bottom at least one of (i) is adjacent to the work surface, (ii) is at least partially separated from the work surface by an air gap, or (iii) includes an electrically non-conductive layer to electrically isolate the bottom from the work surface.

In a variation of this embodiment, the four-sided housing is configured as a passive resonator.

In a variation of this embodiment, parasitic capacitances form on the end, the two sides, and the top responsive to the RF signals, wherein the parasitic capacitances form transmission paths for the RF signals.

In a variation of this embodiment, the end, the two sides, and the top are configured to re-radiate RF signals into the RF reflector with different phases.

In a variation of this embodiment, the RF reflector is configured to increase an effective range of the RFID tag reader.

In another embodiment, a radio frequency (RF) reflector for use with a radio frequency identification (RFID) system comprises a five-sided housing. The five-sided housing including: a bottom comprising a material that at least partially reflects RF signals; and first, second, and third sides comprising a material that at least partially reflects the RF signals, wherein the bottom and the first, second, and third sides are electrically connected; a fourth side having a side opening, the side opening configured to admit the RF signals emitted by a RF identification (RFID) tag reader into the RF reflector, wherein a dimension of the side opening is greater than a quarter wavelength of the RF signals, and wherein the RF reflector is configured to not be electrically coupled to the RFID tag reader; and an open top.

In a variation of this embodiment, the fourth side comprises a material that at least partially reflects RF signals, and wherein the fourth side is electrically connected to the bottom and the first, second, and third sides.

In a variation of this embodiment, (i) the RF reflector is configured to be inverted during use such that the bottom becomes a top, (ii) when the RF reflector is placed on a work surface, the open top is adjacent the work surface, and (iii) the top includes one or more top openings configured to admit at least a portion of objects having RFID tags into the RF reflector such that the RFID tags can be read by the RFID tag reader responsive to the RF signals, wherein at least one of the one or more top openings is positioned at a distance from the side opening that is greater than a native effective range of the RFID tag reader, and wherein a dimension of the one or more top openings is greater than a quarter wavelength of the RF signals.

In a variation of this embodiment, the objects in the one or more top openings can rest on the work surface.

In a variation of this embodiment, the RF reflector is configured to be placed on a work during use such that the end and the first, second, and third sides extend upward from the bottom and upward from the work surface, and one or more objects having RFID tags can be placed on the bottom such that the RFID tags can be read by the RFID tag reader responsive to the RF signals, and wherein the RF reflector is configured such that the RFID tags can be read by the RFID tag reader from distances greater than a native effective range of the RFID tag reader.

In a variation of this embodiment, the bottom includes an electrically non-conductive layer to electrically isolate the RFID tags from the bottom.

In a variation of this embodiment, the five-sided housing is configured as a passive resonator.

In a variation of this embodiment, parasitic capacitances form on the bottom and the first, second, and third sides responsive to the RF signals, wherein the parasitic capacitances form a transmission path for the RF signals.

In a variation of this embodiment, the bottom and the first, second, and third sides are configured to re-radiate RF signals into the RF reflector with different phases.

In a variation of this embodiment, the RF reflector is configured to increase an effective range of the RFID tag reader.

In yet another embodiment, a radio frequency (RF) reflector for use with a radio frequency identification (RFID) system includes a first layer comprising a material that at least partially reflects RF signals, wherein the RF reflector is configured to not be electrically coupled to an RFID tag reader used to read RFID tags positioned above the RF reflector; and a second, electrically non-conductive layer to electrically isolate RFID tags from the first layer, wherein the RF reflector is configured to be placed on a work surface during use.

In a variation of this embodiment, when the RF reflector is in use, the first layer at least one of (i) is adjacent to the work surface, (ii) is at least partially separated from the work surface by an air gap, or (iii) includes a third, electrically non-conductive layer to electrically isolate the first layer from the work surface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
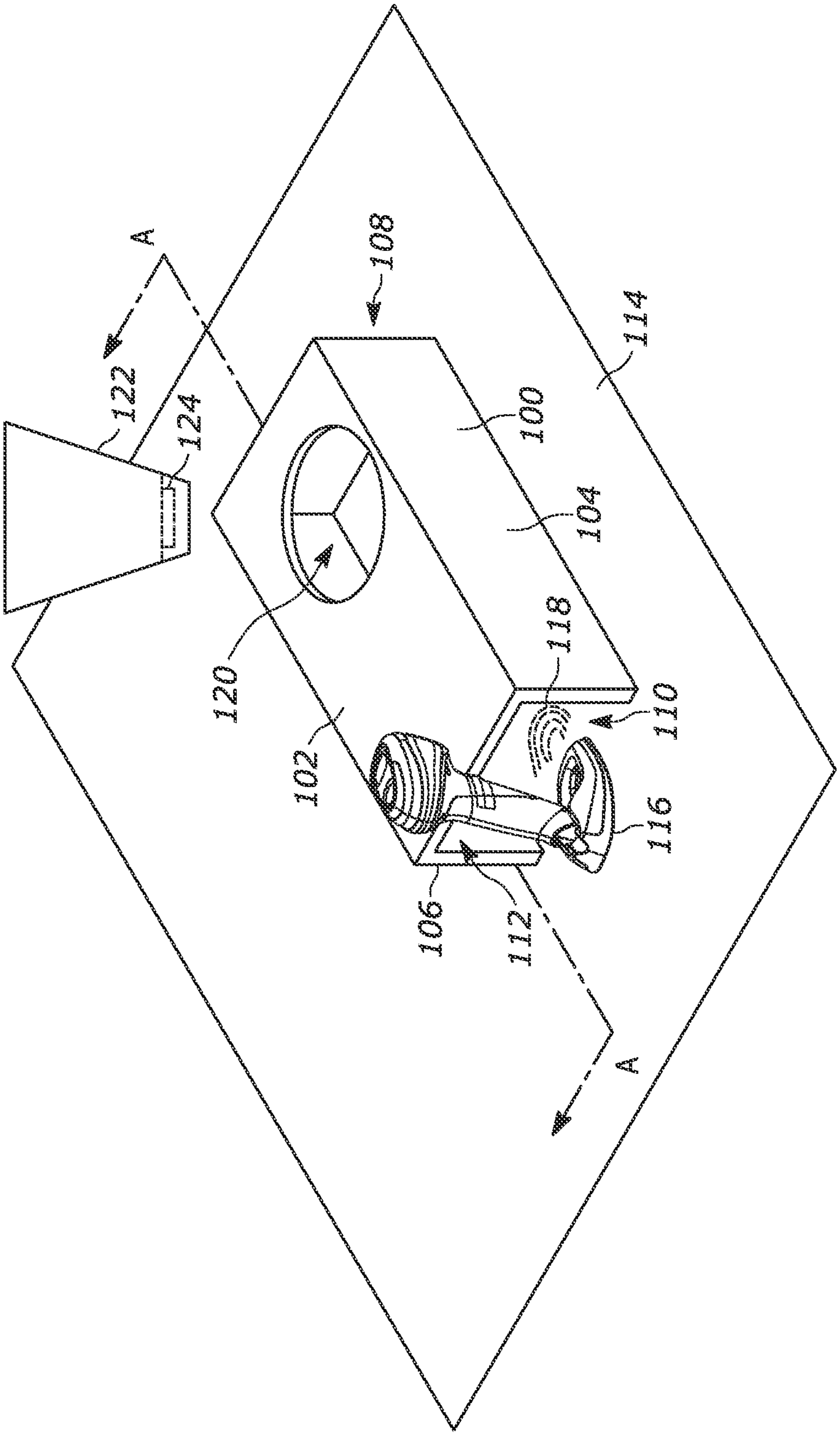
FIG. 1 illustrates an example radio frequency (RF) reflector for use with a radio frequency identification (RFID) system, in accordance with embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Use of terms such as up, down, top, bottom, side, end, front, back, etc. are used herein with reference to a currently considered or illustrated orientation. If such elements are considered with respect to another orientation, it should be understood that such terms should be correspondingly modified.

DETAILED DESCRIPTION

In some circumstances, having to move RFID tags and/or RFID tag readers near to each other so that the RFID tags can be interrogated and read may be inconvenient and/or impractical. In addition to distance limitations due to EIRP or other constraints, the performance of conventional RFID systems may be further limited due to RFID tag location, RFID tag orientation, RFID tag size, RF attenuating or absorptive substances or materials, etc. For example, RFID tags may be located on the bottom of objects (e.g., coffee cups) in a retail environment such that when an object is placed on a work surface during checkout, an edge of an affixed RFID tag may be oriented towards an RFID tag reader, such that the RFID tag reader is effectively located in an RFID null of the RFID tag. Moreover, an RFID tag may be located at, or in, a null of the far field resulting from RF signals emitted by an RFID tag reader. Further, when objects are small, the size of an RFID tag may be limited, thus, further restricting the performance of an RFID system used to interrogate and read the RFID tag. Furthermore, the work surface may be made of a material (e.g., metal) that may effectively short out an RFID tag. Even further, an object may contain a liquid or other substance (e.g., coffee, water, tea, etc.) that may absorb or attenuate RF signals emitted by the RFID tag reader. Such circumstances represent the native working range or conditions of the RFID tag reader. In some circumstances, simply using stronger RF signals may still not result in RFID tags being reliably readable. Moreover, it may not be practical or desirable to have to position RFID tags closer to an RFID tag reader, or in particular orientations, such that the RFID tags are reliably readable. Accordingly, there is a need for an RF reflector that can be used with a conventional RFID tag reader to increase an effective RFID working range or conditions of the RFID tag reader without requiring use of a higher EIRP or modification of the RFID tag reader. The effective working range or conditions of an RFID tag reader represents the areas, directions, distances, etc. in which RFID tags of various sizes in various positions, orientations, etc. can be reliably interrogated and read by the RFID tag reader regardless of the type(s) of objects to which RFID tags may be affixed that results from use of the RFID tag reader with disclosed RF reflectors. Thus, the effective working range of an RFID tag reader resulting from use of disclosed RF reflectors is improved or increased relative to the native working range of the RFID tag reader.

Reference will now be made in detail to non-limiting examples, some of which are illustrated in the accompanying drawings.

Figure 2:
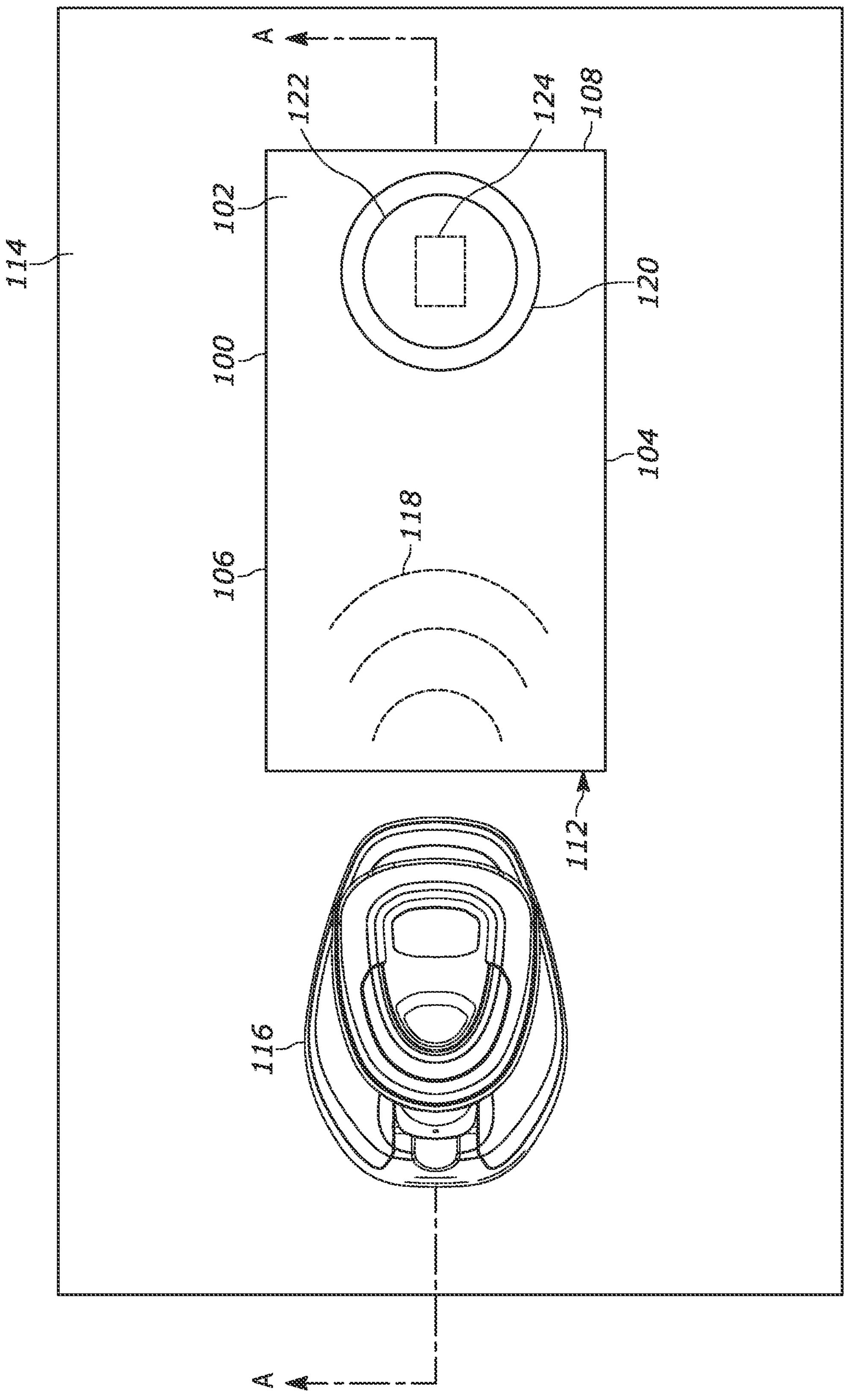
FIG. 2 is a top view of the RF reflector of FIG. 1.
Figure 3:
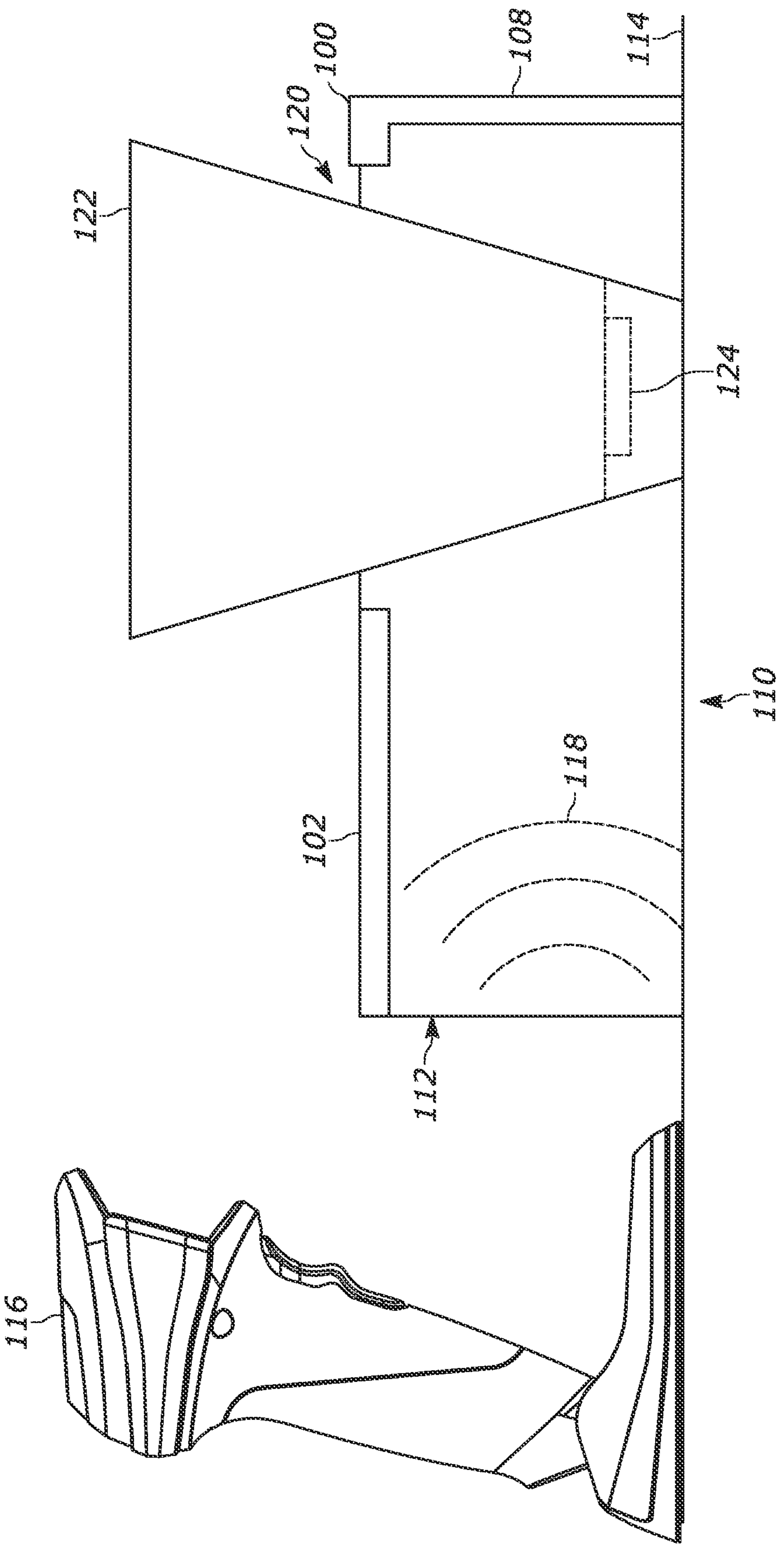
FIG. 3 is a side cross-section view of the RF reflector of FIGS. 1 and 2, taken along line A-A.

FIG. 1 illustrates an example four-sided RF reflector 100 that can be used with a conventional RFID system to improve RFID tag reading performance. FIG. 2 is a top view of the RF reflector 100 of FIG. 1. FIG. 3 is a side cross-section view of the RF reflector 100 of FIGS. 1 and 2, taken along line A-A of FIGS. 1 and 2. The example reflector 100 includes a four-sided housing having a top 102, two sides 104 and 106, and an end 108 formed of one or more materials that at least partially reflect RF signals. In some examples, the top 102, the sides 104 and 106, and the end 108 are formed of an electrically conductive material and are electrically coupled, such that the RF reflector 100 forms an electrically conductive assembly. In some examples, the top

102, the sides 104 and 106, and the end 108 are electrically coupled using an electrically conductive film, sheet, seam, etc. Additionally and/or alternatively, the top 102, the sides 104 and 106, and the end 108 can be formed of an electrically non-conductive material, and covered on at least one side with an electrically conductive film, sheet, etc., thus forming an electrically conductive assembly.

The example RF reflector 100 has an open bottom 110 and an open end 112. As shown, the RF reflector 100 can be used by setting the RF reflector 100 on a work surface 114 (e.g., a counter) such that the open bottom 110 is adjacent the work surface 114; and the sides 104 and 106, and the end 108 extend upwardly from the work surface 114 toward the top 102. In use, an RFID tag reader 116 can be positioned in front of the open end 112 such that RF signals 118 emitted by an antenna (not shown for clarity of illustration) of the RFID tag reader 116 are admitted through the open end 112 into the RF reflector 100. One or more dimensions of the open end 112 may be larger than one-fourth the wavelength of the RF signals 118 (e.g., a quarter wavelength) to allow the RF signals 118 to propagate through the open end 112. In some examples, the RF reflector 100 is configured to not be electrically coupled to the RFID tag reader 116.

At least because (i) the open bottom 110 and the open end 112 are open; (ii) the antenna of the RFID tag reader 116 does not form a feed network for the RF reflector 100; and (iii) the open end 112 is configured to not form a waveguide port, the RF reflector 100 advantageously does not form a waveguide. Instead, the RF reflector 100 forms a passive RF resonator, and/or a parasitic reflector assembly. The RF signals 118 emitted by the RFID tag reader 116 are capacitively or inductively launched into the RF reflector 100 through the open end 112, and travel along the RF reflector 100 from the open end 112 toward the end 108, and reflect off the top 102 and the sides 104 and 106. The end 108, which is electrically coupled to the top 102 and the sides 104 and 106, provides a return path for reflected RF signals. Accordingly, RF signals propagate inside the RF reflector 100 in various different directions. The top 102, the sides 104 and 106, and the end 108 act as passive resonators that reflect and/or re-radiate the RF signals with different phases. As such, parasitic capacitances and/or surface currents can form on the top 102, the sides 104 and 106, and the end 108 responsive to RF signals that form transmission paths for the RF signals. The different RF signals constructively interfere to strengthen RF signals in a desired direction along the RF reflector 100 such that directivity in the desired direction is increased, and destructively interfere to cancel out RF signals in other non-desired directions.

The top 102 includes a top opening 120 defined therein, in which an object (e.g., a cup 122) can at least partially be placed, such that an affixed RFID tag 124 can be interrogated and read using RF signals propagating throughout the RF reflector 100. As shown, an object (e.g., the cup 122) may rest on the work surface 114. Unlike a waveguide, the bottom 110 of the RF reflector 100 is open, such that the RFID tag 124 is may be prevented from being shorted out by an electrically conductive bottom that is typically included in waveguides. Moreover, as described below in connection with FIG. 10, because RF signals propagate inside the RF reflector 100 in various different directions, far field nulls can be obviated and the RFID tag 124 can be interrogated and read by the RFID tag reader 116 even when the RFID tag reader 116 is positioned in an RF null of the RFID tag 124, and/or the object contains a material or substance that may absorb or attenuate RF signals. For example, when the cup 122 is full of a liquid such as water, tea, or coffee. Further, because RF signals propagate along the length of RF reflector 100, RFID tags can be interrogated and read at greater distances from the RFID tag reader 116 without having to modify the RFID tag reader 116 or the object (e.g., the cup 122), and/or without having to increase the EIRP of the RFID tag reader 116. That is, RFID tags can be interrogated and read by the RFID tag reader 116 in positions, orientations, and/or from distances outside than the native effective range or conditions of the RFID tag reader 116 in the absence of the RF reflector 100. In other words, the RF reflector 100 can be used to increase or improve the working range or conditions of the RFID tag reader 116 when sensing RFID tags disposed on objects in positions, orientations, distances, etc. that are conventionally difficult to read. For example, the RF reflector 100 can extend across a counter of a retail point-of-sale, allowing the RFID tag reader 116 to be positioned at one side of the counter near an employee or cash register, while a shopper can easily place the cup 122 into the top opening 120 nearer to them on another side of the counter. The top opening 120 may be dimensioned to be larger than a quarter-wavelength of the RF signals 118 emitted by the RFID tag reader 116 to allow the RF signals 118 to propagate through the top opening 120. While the top opening 120 is round to correspond to cups, the top opening 120 may have another shape, such as square, rectangle, etc. Moreover, while the RF reflector 100 is rectangular, it may have other shapes, such as round, square, wedge shaped, etc. Further, while the RF reflector 100 has an open bottom 110, the RF reflector 100 may have a bottom formed of a non-conductive material, such as plastic, wood, etc.

As shown in FIGS. 1-3, the RFID tag 124 may be affixed within a bottom lip of the cup 122, such that the RFID tag 124 does not come into contact with the work surface 114. Additionally and/or alternatively, the RFID tag 124 may be affixed to a bottom surface of an alternate cup 122 that does not include a bottom lip such that the RFID tag 124 may come into contact with the work surface 114.

In some examples, the RFID tag reader 116 and RFID tag 124 utilize ultra-high frequency RF signals (e.g., using a carrier frequency of 915 MHz). In some examples, the RFID tag reader 116 and the RFID tag 124 are implemented in accordance with a communication interface guideline or standard defined by the RAIN™ Alliance.

Figure 4:
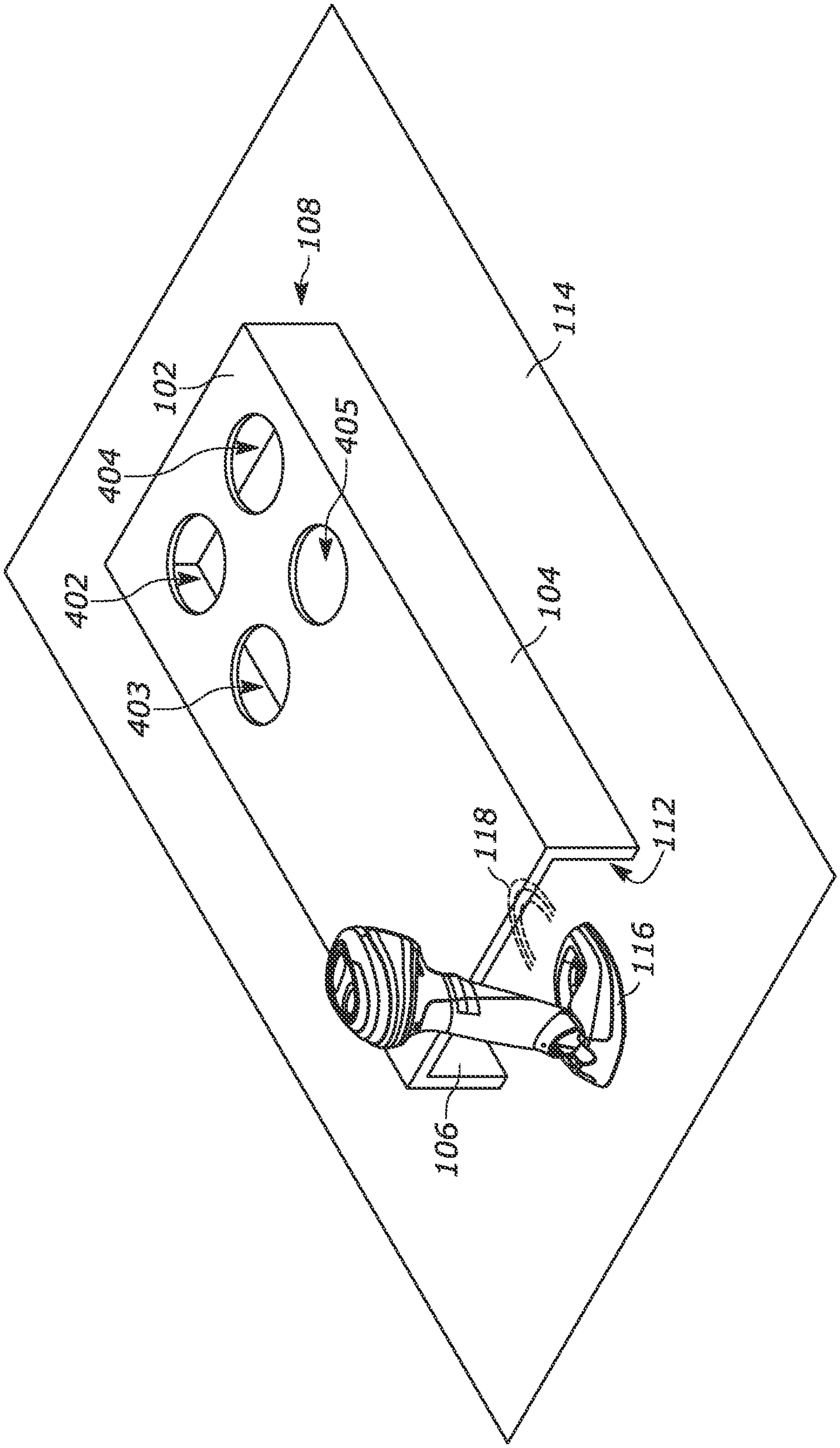
FIG. 4 illustrates another example RF reflector for use with an RFID system, in accordance with embodiments of the disclosure.

FIG. 4 illustrates another example four-sided RF reflector 400 that can be used with a conventional RFID system to improve RFID tag reading performance. While the RF reflector 100 shown in FIGS. 1-3 has a single top opening 120, the example RF reflector 400 includes multiple top openings 402, 403, 404, and 405 defined in the top 102, such that multiple objects having respective RFID tags can at least partially be placed in the RF reflector 400, and interrogated and read at substantially the same time. For example, when a customer is paying for multiple cups of coffee. The top openings 402-405 may have the same and/or different shapes. The top openings 402-405 may be dimensioned to be larger than a quarter-wavelength of the RF signals 118 emitted by the RFID tag reader 116 to allow the RF signals 118 to propagate through the top openings 402-405. In some examples, at least one of the top openings 402-405 is at distance from the RFID tag reader 116 that is greater than or outside the native effective working range for reading RFID tags disposed on a bottom of an object (e.g., the cup 122) of the RFID tag reader 116 in the absence of the RF reflector 100.

Figure 5:
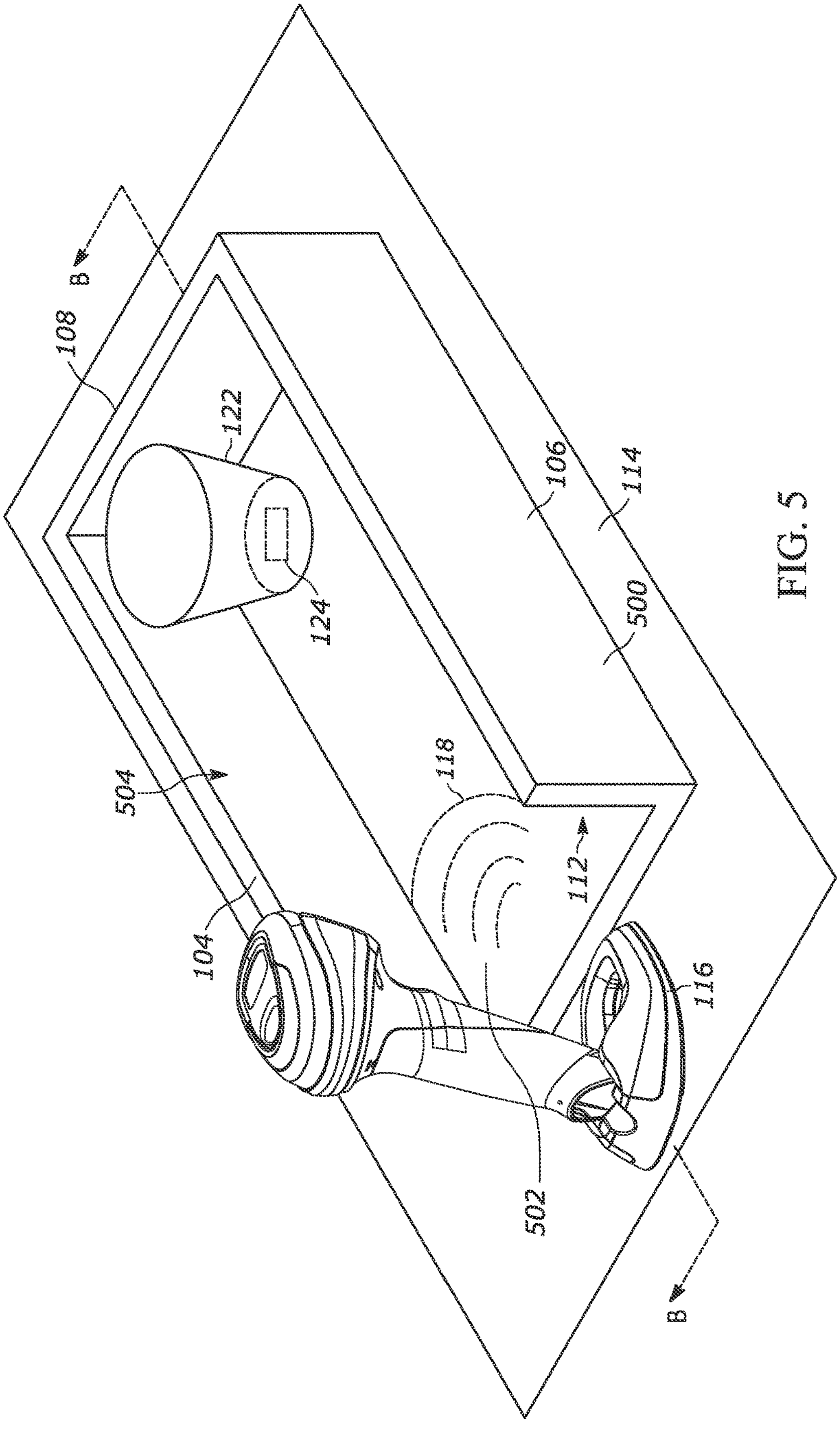
FIG. 5 illustrates yet another example RF reflector for use with an RFID system, in accordance with embodiments of the disclosure.
Figure 6:
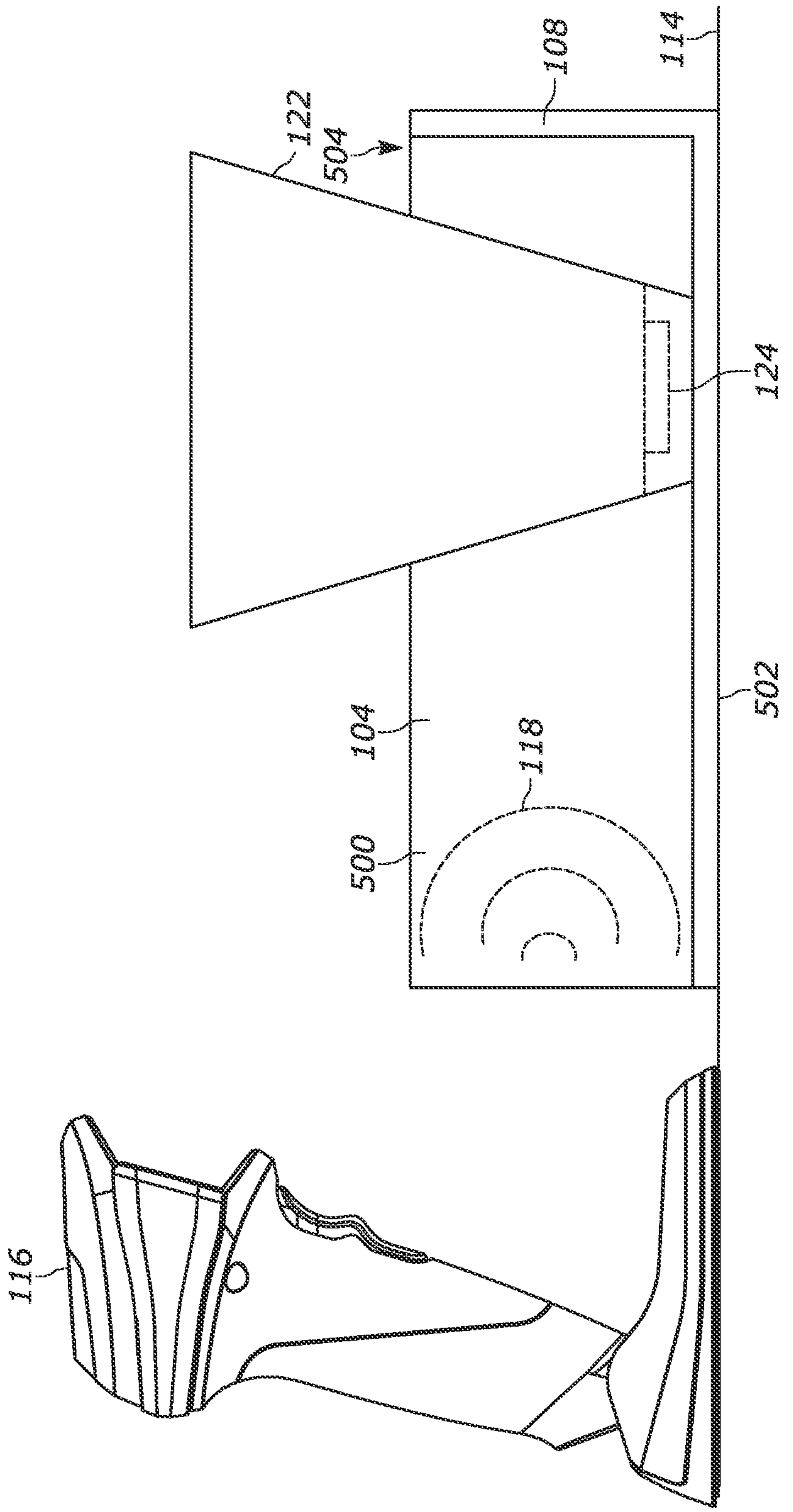
FIG. 6 is a side cross-section view of the RF reflector of FIG. 5, taken along line B-B.

FIG. 5 illustrates yet another example RF reflector 500 that can be used with a conventional RFID system to improve RFID tag reading performance. FIG. 6 is a side cross-section view of the RF reflector 500 of FIG. 5, taken along line B-B of FIG. 5. As shown, the RF reflector 500 is substantially similar to the RF reflector 100, except that the RF reflector 500 is flipped over or inverted such that the top 102 becomes a bottom 502 of the RF reflector 500, and the bottom 502 may not include an opening defined therethrough. Like elements in FIGS. 1-3 and FIGS. 5-6 are shown with like reference numerals, and the description of like elements will not be repeated here. Instead, the interested reader is referred to the description of like elements provided above in connection with FIGS. 1-3. In some examples, an object (e.g., the cup 122) may be placed at least partially in, or on, the RF reflector 500 such that an affixed RFID tag can be oriented, positioned and/or at distances from the RFID tag reader 116 that are outside or greater than the native effective range or conditions of the RFID tag reader 116 in the absence of the RF reflector 100.

As shown, the RF reflector 500 can be used by setting the RF reflector 500 on a work surface 114 such that the bottom 502 is adjacent to, or against, a work surface 114; and the sides 104 and 106, and the end 108 extend upwardly from the bottom 502 and upwardly toward an open top 504. In use, the RFID tag reader 116 can be positioned in front of the open end 112 such that RF signals 118 emitted by an antenna (not shown for clarity of illustration) of the RFID tag reader 116 are admitted into the RF reflector 500. Like the RF reflector 100, one or more dimensions of the open end 112 of the RF reflector 500 may be larger than one-fourth the wavelength of the RF signals 118 (e.g., a quarter wavelength) emitted by the RFID tag reader 116 to allow the RF signals 118 to propagate through the open end 112.

At least because (i) the open top 504 and the open end 112 are open; (ii) the antenna of the RFID tag reader 116 does not form a feed network for the RF reflector 500; and (iii) the open end 112 is configured to not form a waveguide port, the RF reflector 500 does not form a waveguide. Instead, the RF reflector 500 forms a passive resonator and/or a parasitic reflector assembly. Like the RF reflector 100, the RF signals 118 emitted by the RFID tag reader 116 are capacitively or inductively launched into the RF reflector 500 through the open end 112, and travel along the RF reflector 500 from the open end 112 toward the end 108, and reflect off the bottom 502 and the sides 104 and 106. The end 108, which is electrically coupled to the bottom 502 and the sides 104 and 106, provides a return path for reflected RF signals. Accordingly, as described below in connection with FIG. 10, RF signals propagate inside the RF reflector 500 in various different directions.

As shown, objects (e.g., a cup 122) having respective RFID tags (e.g., an RFID tag 124) affixed thereto may be at least partially placed in, or on, the RF reflector 500, such that the RFID tags can be interrogated and read by the RFID tag reader 116. Because, as described below in connection with FIG. 10, RF signals propagate inside the RF reflector 500 in various different directions, RFID tags can be oriented, positioned and/or at distances from the RFID tag reader 116 that are outside or greater than the native effective range or conditions of the RFID tag reader 116 in the absence of the RF reflector 100. Further, because RF signals propagate along the length of RF reflector 500, RFID tags can be interrogated and read at greater distances from the RFID tag reader 116 without having to modify the RFID tag reader 116, and/or without having to increase the EIRP of the RFID tag reader 116. For example, the RF reflector 500 can extend across a counter of a retail point-of-sale, allowing the RFID tag reader 116 to be positioned near an employee or cash register, while a shopper can easily place the RF reflector 500 nearer to them on an opposite side of the counter. While the RF reflector 500 is rectangular, it may have other shapes, such as round, square, wedge shaped, etc.

Figure 7:
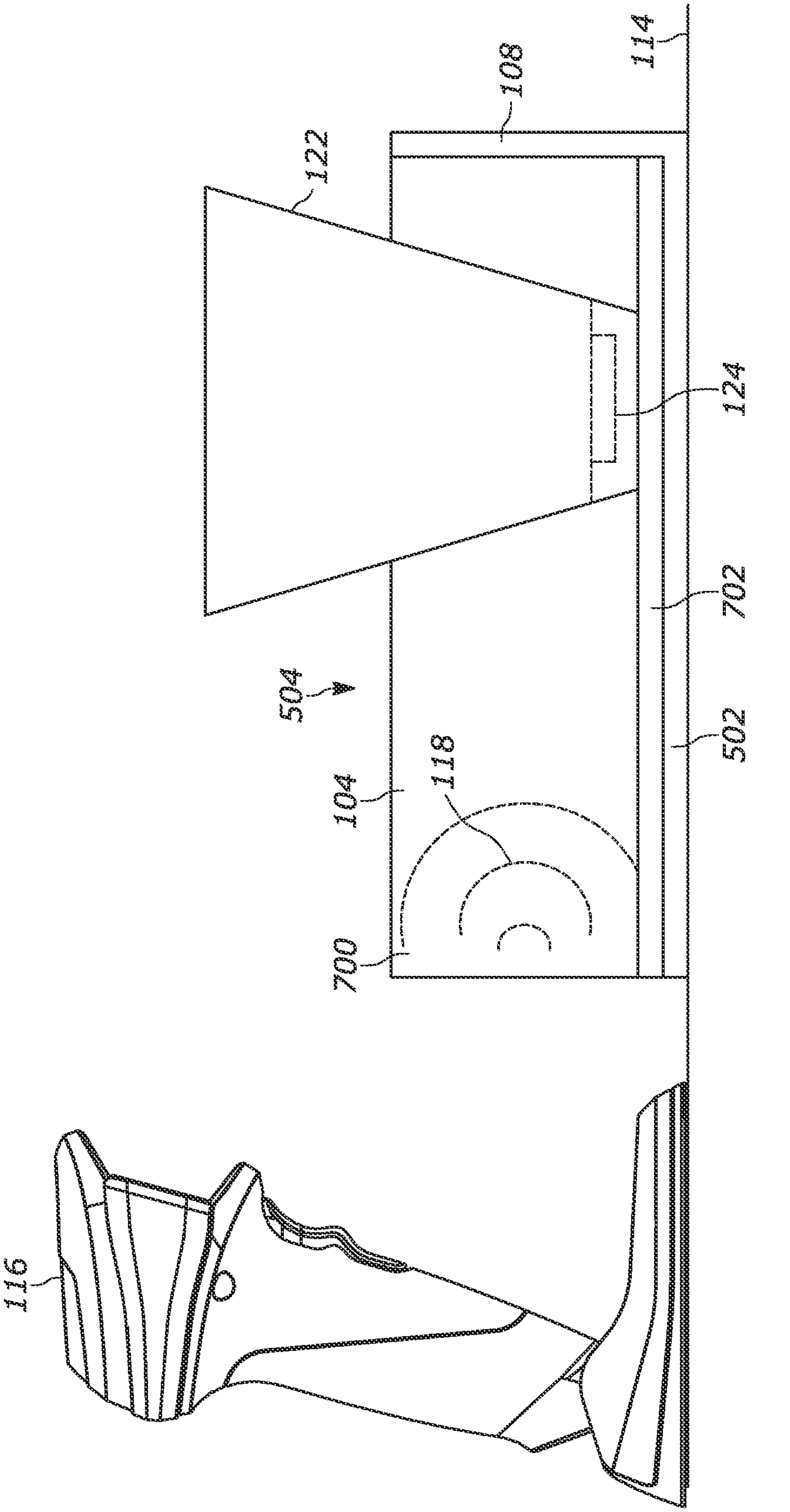
FIG. 7 is a side cross-section view of a further example RF reflector for use with an RFID system, in accordance with embodiments of the disclosure.

FIG. 7 is a side cross-section view of a further example RF reflector 700 that can be used with a conventional RFID system to improve RFID tag reading performance. As shown, the RF reflector 700 is substantially similar to the RF reflectors 100 and 500, except that the bottom 502 includes an at least partial non-conductive layer 702 such that RFID tags can be prevented from being shorted out by the bottom 502. While the layer 702 is shown in FIG. 7 as a continuous layer, the layer 702 may be formed of separate patches or areas that represent where objects should be placed in, or on, the RF reflector 700. Like elements in FIGS. 1-7 are shown with like reference numerals, and the description of like elements will not be repeated here. Instead, the interested reader is referred to the description of like elements provided above in connection with FIGS. 1-6.

Figure 8:
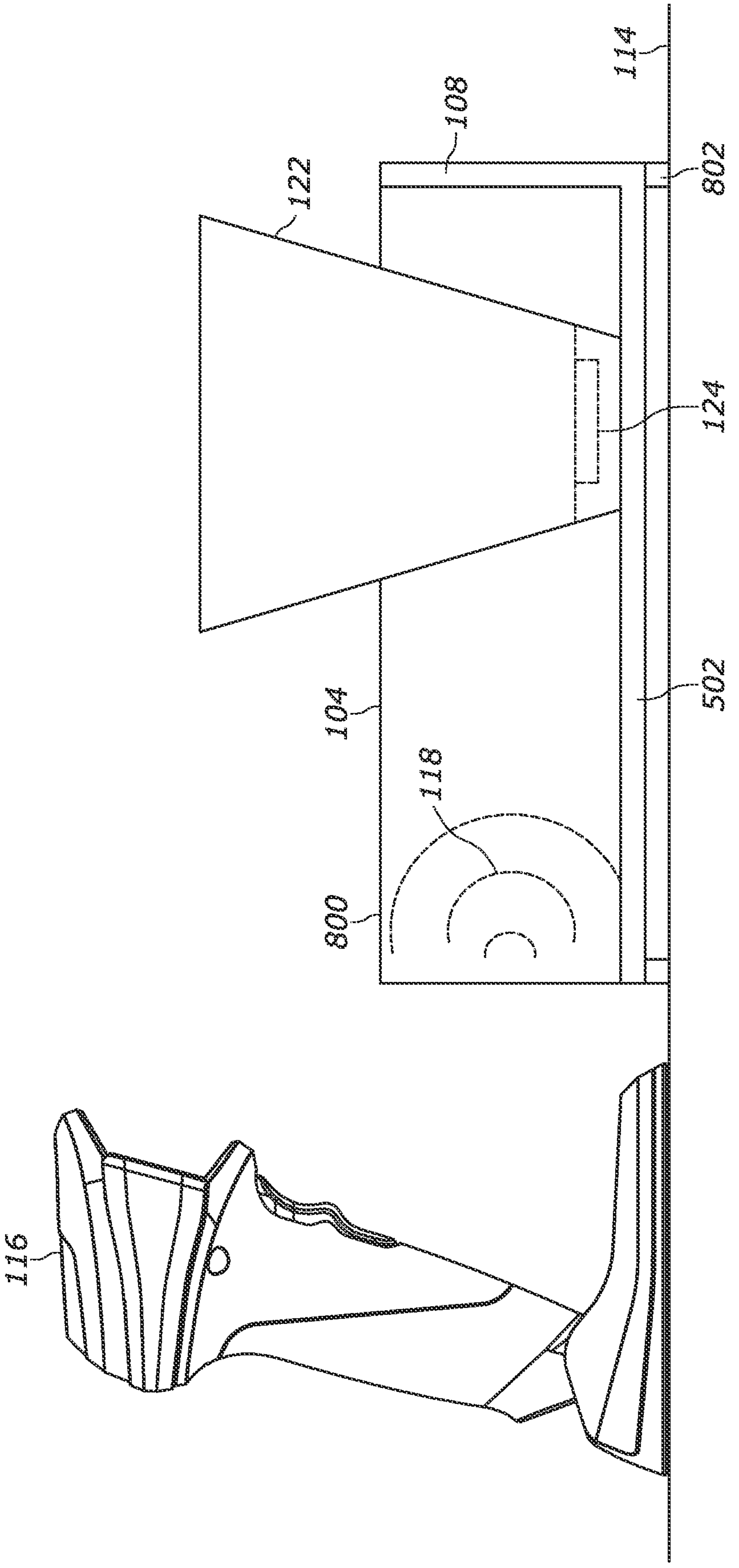
FIG. 8 is a side cross-section view of an even further example RF reflector for use with an RFID system, in accordance with embodiments of the disclosure.

FIG. 8 is a side cross-section view of an even further example RF reflector 800 that can be used with a conventional RFID system to improve RFID tag reading performance. As shown, the RF reflector 800 is substantially similar to the RF reflectors 100 and 500, except that the bottom 502 is spaced apart from the work surface 114 by a lip, layer, or other structure 802. Like elements in FIGS. 1-6 and 8 are shown with like reference numerals, and the description of like elements will not be repeated here. Instead, the interested reader is referred to the description of like elements provided above in connection with FIGS. 1-6.

Figure 9:
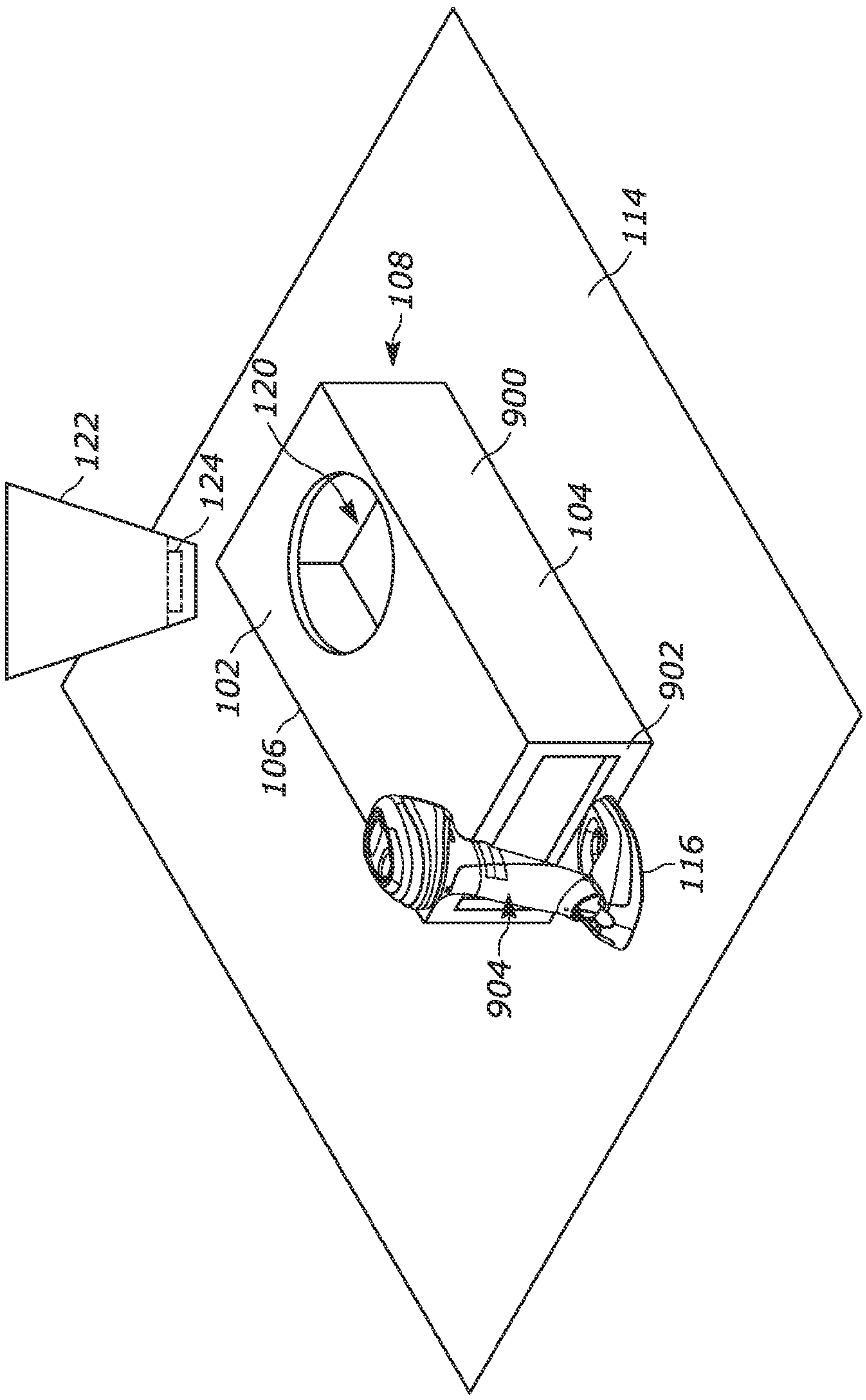
FIG. 9 is a side cross-section view of a still further example RF reflector for use with an RFID system, in accordance with embodiments of the disclosure.

FIG. 9 is a side cross-section view of a still further example RF reflector 900 that can be used with a conventional RFID system to improve RFID tag reading performance. As shown, the RF reflector 900 is substantially similar to the RF reflector 100, except that the RF reflector 900 includes a five-sided housing, and the open end 112 is replaced with a partial end 902 that at least partially reflects RF signals, and includes a side opening 904 defined therein to admit RF signals into the RF reflector 900. Like elements in FIGS. 1-3 and 9 are shown with like reference numerals, and the description of like elements will not be repeated here. Instead, the interested reader is referred to the description of like elements provided above in connection with FIGS. 1-3.

The configuration of FIG. 9 may be useful when, for example, the RF reflector 900 is large compared to the RFID tag reader 116, and the partial end 112 further increases RF signal propagation and, thus, RFID tag reading performance. One or more dimensions of the side opening 904 may be larger than one-fourth the wavelength of the RF signals 118 (e.g., a quarter wavelength) to allow the RF signals 118 to propagate through the side opening 904.

Because RF signals can propagate across the RF reflector 900, RFID tags can be interrogated and read at greater distances from the RFID tag reader 116 without having to modify the RFID tag reader 116, and/or without having to increase the EIRP of the RFID tag reader 116. That is, RFID tags can be interrogated and read by the RFID tag reader 116 within an area that is larger than or outside the native effective range or conditions of the RFID tag reader 116 when the RF reflector 900 is not used. In other words, the RF reflector 900 can increase the working range or conditions of the RFID tag reader 116. For example, the RF reflector 900 can extend across a counter area of a retail point-of-sale, allowing the RFID tag reader 116 to be positioned near an employee or cash register on one side of a counter, while a shopper can easily place the cup 122 into the RF reflector 900 nearer to them on an opposite side of the counter.

As described above in connection with FIGS. 5-8, the RF reflector 900 may be inverted or flipped over to implement an RF reflector with a bottom and an open top.

While example RF reflectors having four or five sides are shown and described herein, RF reflectors having fewer or more sides are envisioned and may be implemented. For instance, another example RF reflector is a simple reflective mat or surface with a non-conductive layer on its top to electrically isolate RFID tags from the mat or surface.

Figure 10:
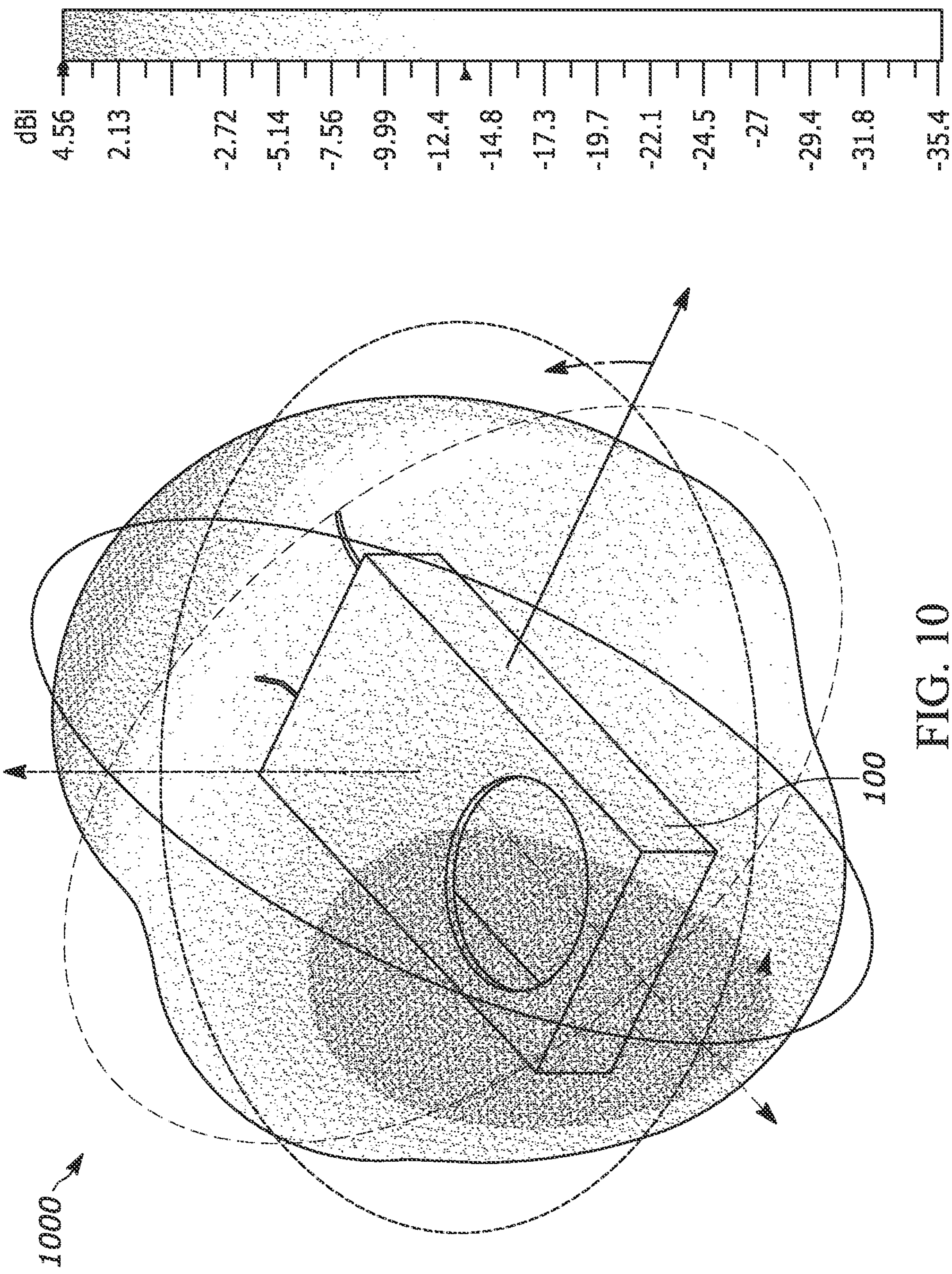
FIG. 10 is a graph of a simulated RF far field that may result from use of the RF reflector of FIG. 1.

FIG. 10 is a graph of a simulated RF far field 1000 that may result from use of the RF reflector 100 of FIG. 1 with the RFID tag reader 116, as described above. As shown, the RF far field 1000 is substantially equally strong in all directions. That is, substantially equally strong RF signals propagate in various different directions within the RF reflector 100. Thus, as shown, the RF reflector 100 can be used to obviate any nulls that may be present in the RFID tag reader's native far field and/or associated RFID tags or objects. It should be appreciated that the other disclosed RF reflectors will likewise result in RF signals propagating in various directions within an RF reflector.

Figure 11:
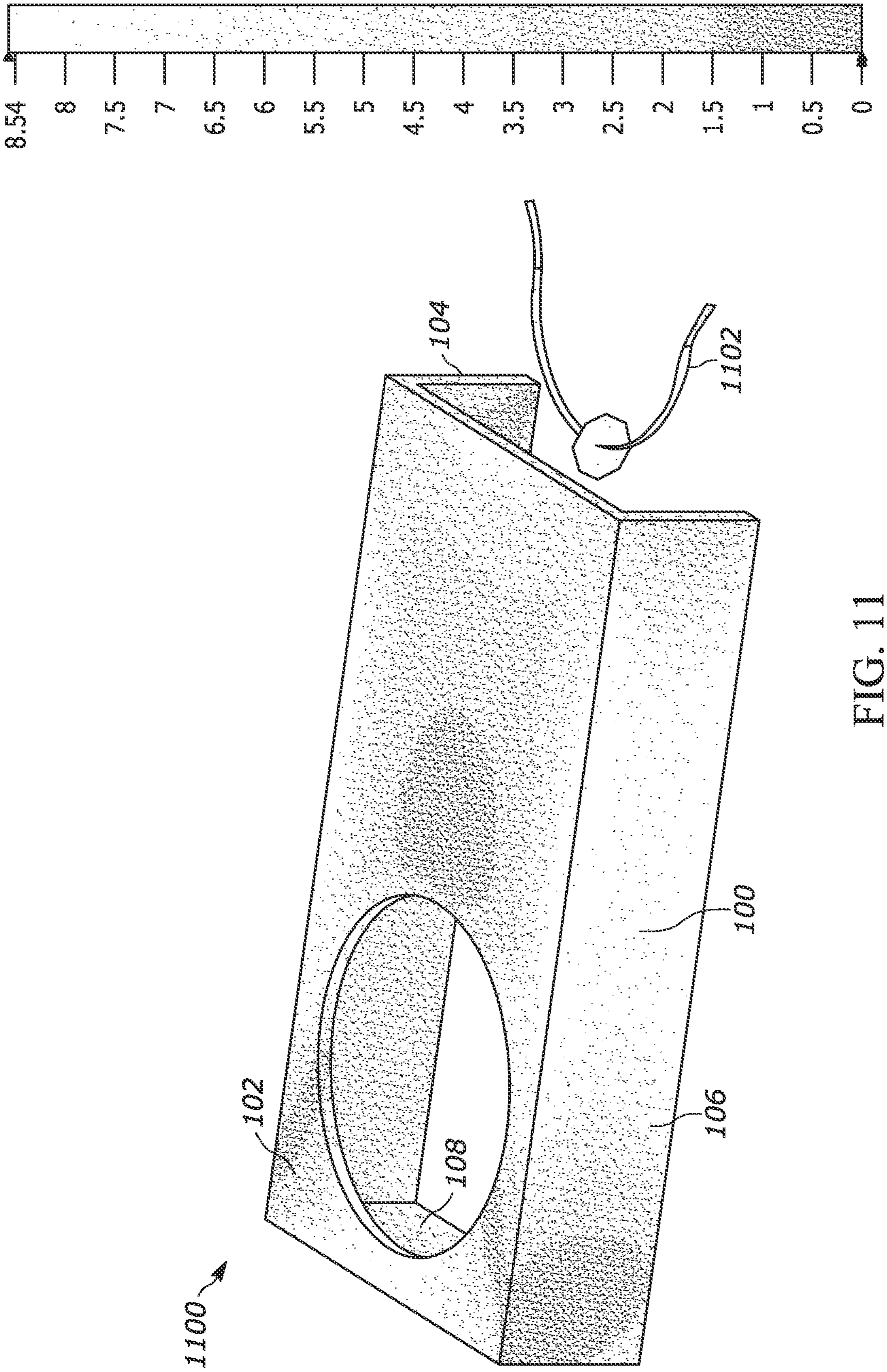
FIG. 11 is a graph of simulated surface currents that may result from use of the RF reflector of FIG. 1.

FIG. 11 is a graph of simulated surface currents 1100 that may result from use of the RF reflector 100 of FIG. 1 with the RFID tag reader 116, as described above. As shown, current flowing through an antenna 1102 of the RFID tag reader 116 results in substantially equally strong surface currents 1100 flowing through the top 102, sides 104 and 106, and end 108. It should be appreciated that the other disclosed RF reflectors will likewise result in similar surface currents.

The above description refers to aspects of the accompanying drawings. Alternative implementations of the examples represented by the diagrams include one or more additional or alternative elements. Additionally or alternatively, one or more of the elements of the diagrams may be combined, divided, re-arranged, or omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A radio frequency (RF) reflector for use with a radio frequency identification (RFID) system, comprising:

a four-sided housing, including:

an open end configured to admit RF signals emitted by a RFID tag reader into the RF reflector, a dimension of the open end being greater than a quarter wavelength of the RF signals, and the RF reflector configured to not be electrically coupled to the RFID tag reader;

an end comprising a material that at least partially reflects the RF signals;

two sides comprising a material that at least partially reflects the RF signals;

a top comprising a material that at least partially reflects the RF signals; and an open bottom, wherein the end, the two sides, and the top are electrically connected, the RF reflector is configured to be inverted during use such that the top becomes a bottom, such that the end and the two sides extend upward from the bottom and upward from the work surface, one or more objects having RFID tags can be placed on the bottom such that the RFID tags can be read by the RFID tag reader responsive to the RF signals, and the RF reflector is configured such that the RFID tags can be read by the RFID tag reader from distances greater than a native effective range of the RFID tag reader.

2. The RF reflector of claim 1 wherein the RF reflector is configured to be placed on a work surface during use such that the open bottom is adjacent the work surface, wherein the top includes one or more top openings configured to admit at least a portion of objects having RFID tags into the RF reflector such that the RFID tags can be read by the RFID tag reader responsive to the RF signals, wherein at least one of the one or more top openings is positioned at a distance from the open end that is greater than a native effective range of the RFID tag reader, and wherein a dimension of the one or more top openings is greater than a quarter wavelength of the RF signals.

3. The RF reflector of claim 2, wherein the objects in the one or more top openings can rest on the work surface.

4. The RF reflector of claim 1, wherein, when the bottom includes an electrically non-conductive layer to electrically isolate RFID tags from the bottom.

5. The RF reflector of claim 1, wherein, when the RF reflector is in use, the bottom at least one of (i) is adjacent to the work surface, (ii) is at least partially separated from the work surface by an air gap, or (iii) includes an electrically non-conductive layer to electrically isolate the bottom from the work surface.

6. The RF reflector of claim 1, wherein the four-sided housing is configured as a passive resonator.

7. The RF reflector of claim 1, wherein the RF reflector is configured such that parasitic capacitances form on the end, the two sides, and the top responsive to the RF signals, and the parasitic capacitances form transmission paths for the RF signals.

8. The RF reflector of claim 1, wherein the end, the two sides, and the top are configured to:

re-radiate RF signals into the RF reflector with different phases.

9. The RF reflector of claim 1, wherein the RF reflector is configured to increase an effective range of the RFID tag reader.

10. A radio frequency (RF) reflector for use with a radio frequency identification (RFID) system, comprising:

a five-sided housing, including:

an end comprising a material that at least partially reflects the RF signals;

a bottom comprising a material that at least partially reflects RF signals; and first, second, and third sides comprising a material that at least partially reflects the RF signals, the bottom and the first, second, and third sides being electrically connected;

a fourth side having a side opening, the side opening configured to admit the RF signals emitted by a RFID tag reader into the RF reflector, a dimension of the side opening being greater than a quarter wavelength of the RF signals, and the RF reflector being configured to not be electrically coupled to the RFID tag reader; and an open top, wherein the RF reflector is configured to be inverted during use such that the bottom becomes a top, the open top is adjacent to a work surface when the RF reflector is placed on the work surface, the top includes one or more top openings configured to admit at least a portion of objects having RFID tags into the RF reflector such that the RFID tags can be read by the RFID tag reader responsive to the RF signals, at least one of the one or more top openings being positioned at a distance from the side opening that is greater than a native effective range of the RFID tag reader, and a dimension of the one or more top openings being greater than a quarter wavelength of the RF signals.

11. The RF reflector of claim 10, wherein the fourth side comprises a material that at least partially reflects RF signals, and wherein the fourth side is electrically connected to the bottom and the first, second, and third sides.

12. The RF reflector of claim 10, wherein the objects in the one or more top openings can rest on the work surface.

13. The RF reflector of claim 10, wherein the RF reflector is configured to be placed on the work surface during use such that the end and the first, second, and third sides extend upward from the bottom and upward from the work surface, wherein one or more objects having RFID tags can be placed on the bottom such that the RFID tags can be read by the RFID tag reader responsive to the RF signals, and wherein the RF reflector is configured such that the RFID tags can be read by the RFID tag reader from distances greater than a native effective range of the RFID tag reader.

14. The RF reflector of claim 13, wherein the bottom includes an electrically non-conductive layer to electrically isolate the RFID tags from the bottom.

15. The RF reflector of claim 10, wherein the five-sided housing is configured as a passive resonator.

16. The RF reflector of claim 10, wherein the RF reflector is configured such that parasitic capacitances form on the bottom and the first, second, and third sides responsive to the RF signals, and the parasitic capacitances form a transmission path for the RF signals.

17. The RF reflector of claim 10, wherein the bottom and the first, second, and third sides are configured to:

re-radiate RF signals into the RF reflector with different phases.

18. The RF reflector of claim 10, wherein the RF reflector is configured to increase an effective range of the RFID tag reader.

* * * * *